(12) United States Patent
Parisian et al.

(10) Patent No.: US 12,311,897 B2
(45) Date of Patent: May 27, 2025

(54) CONSIST SWAP MODE WITH ROLLAWAY MITIGATION

(71) Applicant: New York Air Brake LLC, Watertown, NY (US)

(72) Inventors: Michael L. Parisian, Dexter, NY (US); Scott E. Margeson, Watertown, NY (US)

(73) Assignee: New York Air Brake LLC, Watertown, NY (US)

( * ) Notice: Subject to any disclaimer, the term of this patent is extended or adjusted under 35 U.S.C. 154(b) by 0 days.

(21) Appl. No.: 18/569,724

(22) PCT Filed: Jul. 1, 2022

(86) PCT No.: PCT/US2022/035904
§ 371 (c)(1),
(2) Date: Dec. 13, 2023

(87) PCT Pub. No.: WO2023/278820
PCT Pub. Date: Jan. 5, 2023

(65) Prior Publication Data
US 2024/0262329 A1 Aug. 8, 2024

Related U.S. Application Data

(60) Provisional application No. 63/217,549, filed on Jul. 1, 2021.

(51) Int. Cl.
*B60T 13/66* (2006.01)
*B60T 8/17* (2006.01)
(Continued)

(52) U.S. Cl.
CPC .......... *B60T 13/683* (2013.01); *B60T 8/1705* (2013.01); *B60T 8/171* (2013.01); *B60T 17/04* (2013.01); *B60T 17/06* (2013.01)

(58) Field of Classification Search
CPC .... B60T 13/266; B60T 8/1705; B60T 13/683; B60T 8/171; B60T 17/04; B60T 17/06
See application file for complete search history.

(56) References Cited

U.S. PATENT DOCUMENTS

| 5,192,118 A | 3/1993 | Balukin et al. |
| 5,317,751 A * | 5/1994 | Novakovich ....... B61L 15/0081 701/19 |

(Continued)

FOREIGN PATENT DOCUMENTS

| CA | 2460628 A1 | 3/1993 |
| EP | 1531109 A1 | 3/2007 |

OTHER PUBLICATIONS

International Search Report and Written Opinion dated Oct. 27, 2022.

*Primary Examiner* — Bradley T King
(74) *Attorney, Agent, or Firm* — David L. Nocilly; Bond Schoeneck & King, PLLC (57) ABSTRACT

A computer controlled brake that can selectively operate the 13 control portion exhaust magnet valve to couple the 13 pipe to atmosphere and the 20 control portion lead/trail magnet valve to pressurize the 20 pipe pressure of a trail locomotive in response to "consist swap" mode enabled while switching ends of a locomotive consist. The computer controlled brake is also configured to operate 13 control portion exhaust magnet valve to disconnect the source of 13 pipe pressure from atmosphere and to de-energize 20 control portion lead/trail magnet valve to stop pressurizing the source of 20 pipe pressure in response to sensing a rise in brake pipe from a newly established lead locomotive disabling "consist swap" mode.

12 Claims, 5 Drawing Sheets

(51) Int. Cl.
*B60T 8/171* (2006.01)
*B60T 13/68* (2006.01)
*B60T 17/04* (2006.01)
*B60T 17/06* (2006.01)

(56) References Cited

U.S. PATENT DOCUMENTS

| | | | | |
|---|---|---|---|---|
| 5,415,465 | A * | 5/1995 | Skantar | B60T 13/665 |
| | | | | 303/3 |
| 6,067,485 | A * | 5/2000 | Balukin | B60T 17/228 |
| | | | | 701/19 |
| 6,098,006 | A * | 8/2000 | Sherwood | B60T 13/665 |
| | | | | 701/19 |
| 7,715,956 | B2 * | 5/2010 | Bryant | B61C 17/12 |
| | | | | 701/19 |
| 8,123,305 | B2 * | 2/2012 | Root | B60T 13/665 |
| | | | | 303/7 |
| 9,963,126 | B1 * | 5/2018 | Wright | B60T 13/662 |
| 10,807,575 | B2 * | 10/2020 | Leonard | B60T 13/665 |
| 2002/0147538 | A1 * | 10/2002 | Marra | B60T 13/665 |
| | | | | 701/19 |
| 2004/0183362 | A1 * | 9/2004 | Root | B60T 15/302 |
| | | | | 303/7 |
| 2005/0099061 | A1 * | 5/2005 | Hollandsworth | B60T 17/04 |
| | | | | 303/7 |
| 2005/0189815 | A1 * | 9/2005 | Bryant | B61C 17/12 |
| | | | | 303/3 |
| 2018/0079396 | A1 * | 3/2018 | Leonard | B60T 13/665 |
| 2020/0094804 | A1 | 3/2020 | Chlumecky et al. | |
| 2021/0188223 | A1 * | 6/2021 | Rossmann | B60T 7/12 |

* cited by examiner

CONSIST SWAP MODE WITH ROLLAWAY MITIGATION

BACKGROUND OF THE INVENTION

1. Field of the Invention

The present invention relates to locomotive control system and, more specifically, to an approach for preventing rollaway during a consist swap.

2. Description of the Related Art

When changing ends of a locomotive consist, the locomotives in the consist are subjected to an automatic and an independent brake application, often referred to as being "bottled." Before a new lead locomotive is established through a consist swap, however, there is a potential for undesired movement as a result of two common failures. First, there may be undesired movement as a result of unintended 13 pipe pressurization, which results in the loss of the locomotive automatic brake. Second, there may be leakage in the 20 pipe, which results in a loss of the locomotive independent brake. Accordingly, there is a need for an approach that will prevent undesired movement of the locomotives during a consist swap.

BRIEF SUMMARY OF THE INVENTION

The present invention addresses the common failures that can lead to a rollaway during a consist swap by exhausting 13 pipe pressure through the 13 control portion (CP) exhaust magnet valve (MVE), thereby preventing any pressurization of 13 pipe and subsequent release (bail off) of the locomotive automatic brake, and by maintaining 20 pipe pressure against leakage using the 20 CP lead/trail magnet valve (MVLT) supply circuit to keeping the brake cylinder pressure applied according to consist swap mode override. When the consist swap mode of the present invention is enabled, the newly established rail locomotive will sense a rise in brake pipe pressure from the currently established lead locomotive. The 13CP MVE will close, and 20CP MVLT will de-energize, resulting in the consist swap "mode" to be disabled, reverting back to nominal trail locomotive 2 pipe operation. For example, the present invention may be implemented by a computer controlled brake (CCB) electro pneumatic control unit (ECPU) having an MV13E valve that can selectively couple a source of 13 pipe pressure to atmosphere and a 20CP MVLT that can selectively pressurize a source of 20 pipe pressure. When initiated via a locomotive computer display in the cab of locomotive by an operator that wishes to switch the end of a locomotive consist, the ECPU is programmed to operate the MV13E valve to couple the source of 13 pipe pressure to atmosphere and to energize the 20CP MVLT to pressurize the source of 20 pipe pressure. The ECPU is also programmed to automatically operate the MV13E valve to disconnect the source of 13 pipe pressure from atmosphere and to de-energize the 20CP MVLT to stop pressurizing the source of 20 pipe pressure in response to a sensed rise in brake pipe pressure from a newly established trail locomotive. The consist swap mode of the newly established trail locomotive is then disabled.

In one embodiment, the invention may be an electronic air brake system having a computer controlled brake having a first magnet valve that can selectively couple a source of 13 pipe pressure to atmosphere and a second magnetic valve that can selectively pressurize a source of 20 pipe pressure. The computer controlled brake is programmed to operate the first magnet valve to couple the source of 13 pipe pressure to atmosphere and to operate the second magnet valve to pressurize the source of 20 pipe pressure in response to an operator input indicating a consist swap is to take place. The computer controlled brake may be further programmed to operate the first magnetic valve to disconnect the source of 13 pipe pressure from atmosphere and to operate the second magnetic valve to stop pressurizing the source of 20 pipe pressure in response to detection of a rise in brake pipe pressure resulting from a new lead locomotive. The computer controlled brake may include an electro-pneumatic control unit that is programmed to operate the first magnet valve and the second magnet valve. The computer controlled brake may include a first electropneumatic portion containing the first magnetic valve and a second pneumatic portion containing the second magnetic valve. The first electropneumatic portion may contain a first set of pneumatic components for controlling the 13 pipe during operation of a train. The electro-pneumatic control unit may be programmed to operate the first magnetic valve of the first electropneumatic portion to exhaust the 13 pipe to disable the locomotive automatic brake during a bail off. The second electropneumatic portion may contain a second set of pneumatic components for controlling the 20 pipe during operation of the train. The electro-pneumatic control unit may be programmed to operate the second magnetic valve of the second electropneumatic portion to connect the 20 pipe to a main reservoir of the train. A locomotive computer display may receive the operator input indicating the consist swap is to take place.

In another embodiment, the invention may be a method of performing a consist swap without a risk of rollaway. One step involves provides a computer controlled brake having a first magnet valve that can selectively couple a source of 13 pipe pressure to atmosphere and a second magnetic valve that can selectively pressurize a source of 20 pipe pressure. Another step involves receiving an operator input indicating a consist swap is desired. A further step involves using the computer controlled brake to operate the first magnet valve to couple the source of 13 pipe pressure to atmosphere and to operate the second magnet valve to pressurize the source of 20 pipe pressure. The method may also include the step of using the computer controlled brake to operate the first magnetic valve to disconnect the source of 13 pipe pressure from atmosphere and to operate the second magnetic valve to stop pressurizing the source of 20 pipe pressure in response to detection of a rise in brake pipe pressure. The step of using the computer controlled brake to operate the first magnet valve to couple the source of 13 pipe pressure to atmosphere and to operate the second magnet valve to pressurize the source of 20 pipe pressure may be performed by an electro-pneumatic control unit of the computer controlled brake. The step of using the computer controlled brake to operate to operate the first magnetic valve to disconnect the source of 13 pipe pressure from atmosphere and to operate the second magnetic valve to stop pressurizing the source of 20 pipe pressure in response to detection of a rise in brake pipe pressure may be performed by the electro-pneumatic control unit of the computer controlled brake. The step of receiving the operator input indicating the consist swap is desired may be performed by locomotive computer display of the computer controlled brake.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
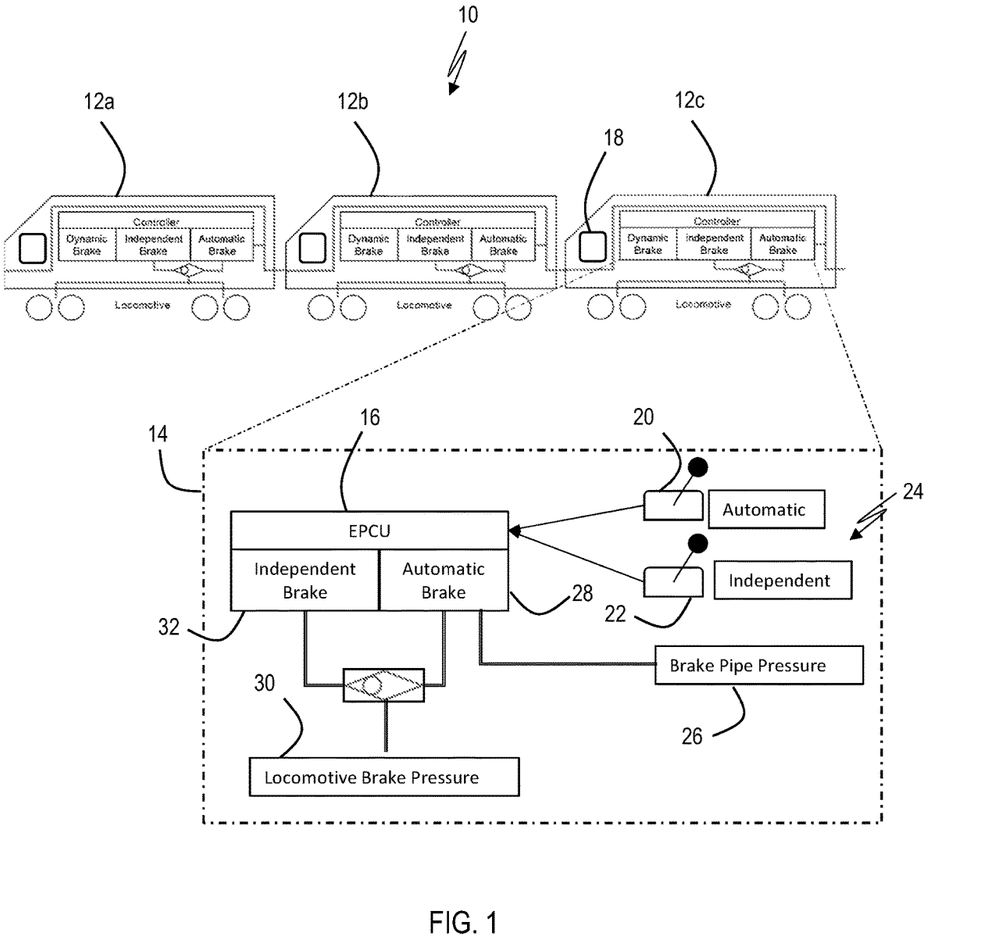
FIG. 1 a schematic of a locomotive consist having at least a trail locomotive including a computer controller brake according to the present invention.

Referring to the drawings, wherein like numerals refer to like parts throughout, therein seen in FIG. 1 an electronic air brake system 10 that has been configured to address the common failures that can lead to a rollaway during a consist swap when a given locomotive 12a is switched between LEAD and TRAIL modes in favor of another locomotive 12b or 12c in the consist that is switched from TRAIL to LEAD mode. For the purposes of illustrating the invention, system 10 installed on each locomotive 12a comprises a computer controlled brake 14 with an electronic brake valve 24 positioned in the cab of each locomotive 12 to provide an automatic brake handle 20 and an independent brake handle 22, and an electro-pneumatic control unit (ECPU) 16 that operates the locomotive braking system in response to, among other things, movement of automatic brake handle 20 and an independent brake handle 22. Computer controlled brake 14 includes programmable components that are configured to manage the pneumatic interfaces between the locomotive brake system and the consist and controls the brake cylinders, the brake pipe, the independent application and release pipe as well as the actuating pipe of the locomotive. For example, ECPU 16 generally includes programmable computing devices, such as microcontrollers, that are programmed with software to operate the locomotive braking system in a particular manner in response to various operator inputs and sensed conditions. Programming of electronic air brake system 10 could be accomplished with programmable devices located in any of the components of electronic air brake system 10, including standalone devices, and thus is generally referred to programming of computer controlled brake 14 herein. A locomotive computer display 18 is positioned in the cab of each locomotive 12 to provide the operator with electronic air brake system 10 information and to allow the operator to initiate certain locomotive system functions beyond basic brake applications, as explained herein. It should be noted that while particular terminology used herein for various hardware and software equipment is most commonly used with the electronic air brake system known as the CCB II® computer controlled brake available from New York Air Brake, LLC of Watertown, New York, other electronic air brake systems may include the equipment identified with different names.

Referring to FIG. 1, in a locomotive consist, a number of locomotives 12b and 12c, for example, may be paired with one locomotive 12a. Computer controlled brake 14 of the present invention is configured to be manually placed into a consist swap mode by the operator via input into locomotive computer display 18, so that the designated LEAD and TRAIL locomotives can be changed without an unintended release of the automatic brake or the independent brake of the newly established trail locomotive 12a that would result in an undesired rollaway of the trail locomotive consist 12a, 12b, and 12c. Although discussed in terms of the operation of computer controlled brake 14 in trail locomotive 12c (or 12b), which is to become the new lead locomotive, the present invention is preferably implemented in the electronic air brake system 10 of all locomotives in a fleet, so that any locomotive can serve a trail or lead locomotive as desired.

Figure 2:
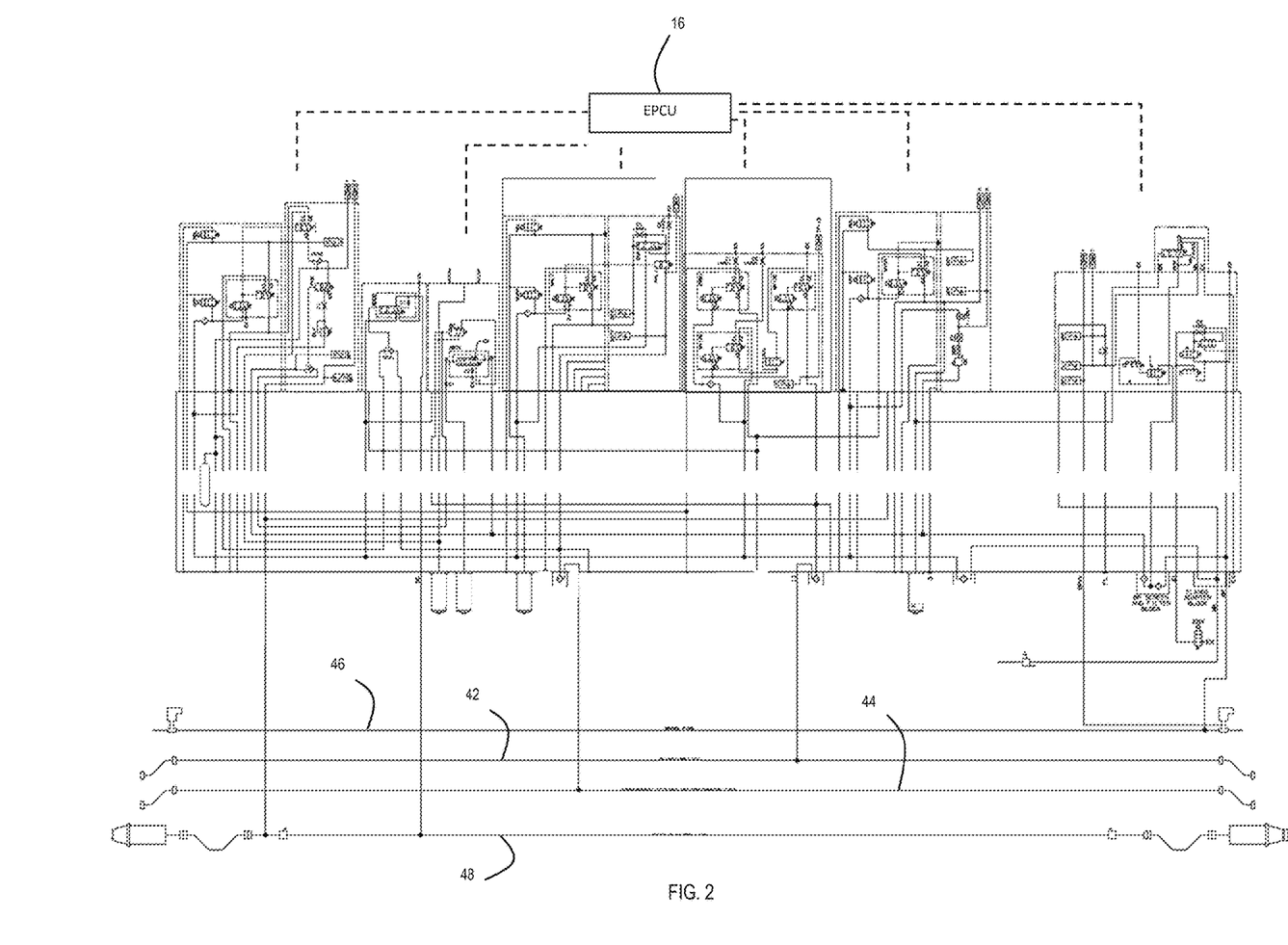
FIG. 2 is a schematic of the electropneumatic circuits of a computer controller brake according to the present invention.

Referring to FIG. 2, computer controlled brake 14 includes a series of electropneumatic portions, each of which includes the pneumatic components, such as piping, valves, and volumes, that are specifically configured to perform a specific braking function or operation in response to a specifically configured controller, such as the software programming of ECPU 16. In order to sense, react to, and control various braking functions via the various electropneumatic portions, computer controlled brake 14 is coupled to various train and locomotive pressure lines, namely, the brake pipe 46, the actuating pipe 42 (generally referred to as the 13 pipe), the independent application and release pipe 44 (generally referred to as the 20 pipe), as well as the locomotive brake cylinder pipe 48. A central controller such as ECPU 16 is coupled each to the electropneumatic portions to read the output from the associated sensors, such as pressure sensors, and to actuate the pneumatic components, such as magnetic valves.

Figure 3:
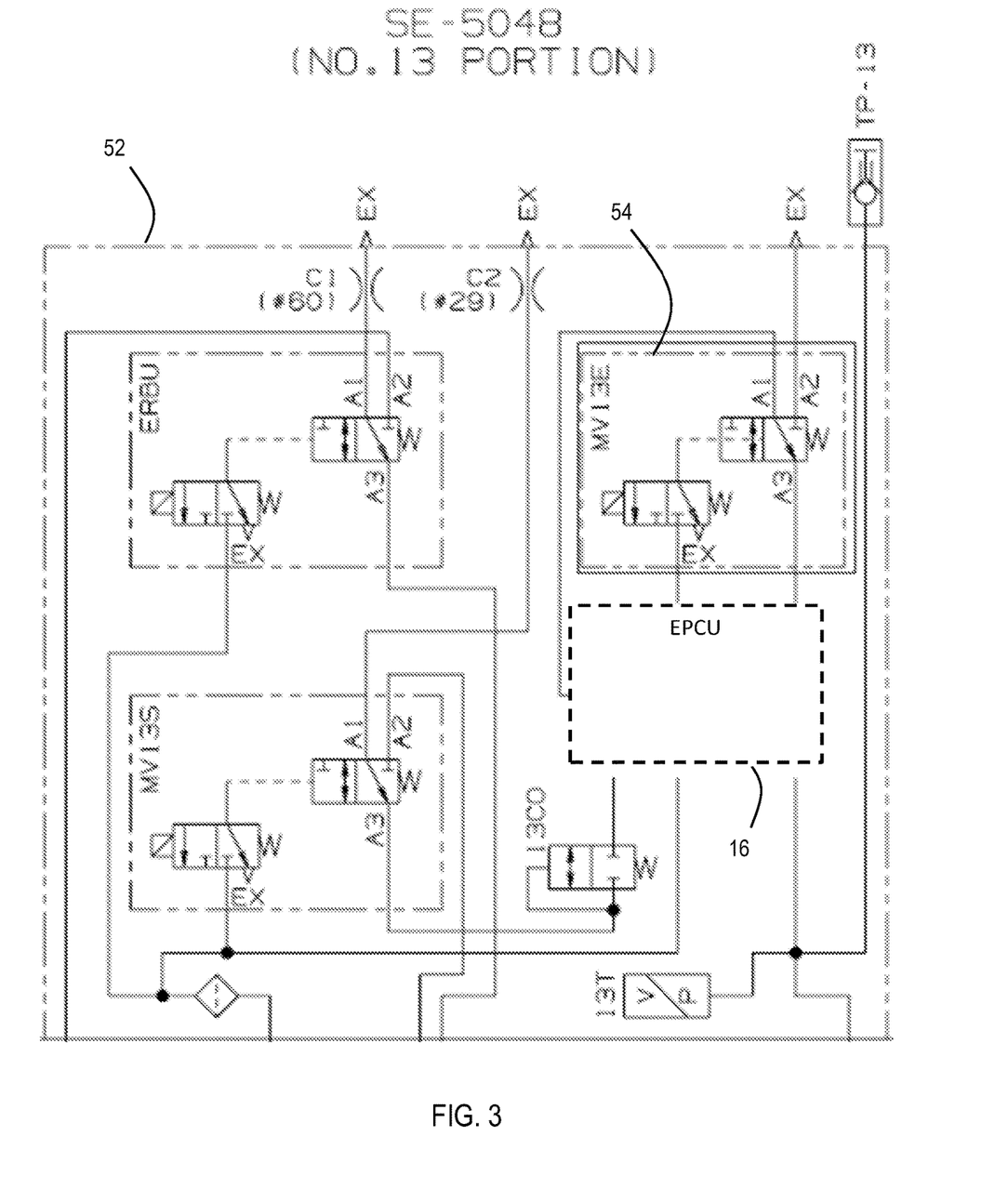
FIG. 3 is a schematic of the No. 13 electropneumatic circuit of a computer controller brake according to the present invention.

Referring to FIG. 3, computer controlled brake 14 includes an electropneumatic portion 52, known as the "No. 13 Portion," that includes the necessary pneumatic components for properly controlling the 13 pipe during operation of the train. No. 13 Portion 52 includes a magnetic exhaust valve (MV13E) 54 that is normally responsible for rapidly exhausting the 13 pipe for disabling the locomotive automatic brake via bail off during LEAD mode of operation. Computer controlled brake 14 is programmed according to the present invention to operate MV13E valve 54 to vent the 13 pipe 42 to atmosphere when the locomotive control system is set to consist swap mode according to the present invention via operator input into locomotive computer display 50. For example, the software of ECPU 16 can include programming for the operation of MV13E valve 54 in connection with the present invention. In this manner, the present invention can take advantage of the existing structure of computer controlled brake 14 to implement the new consist swap mode.

Figure 4:
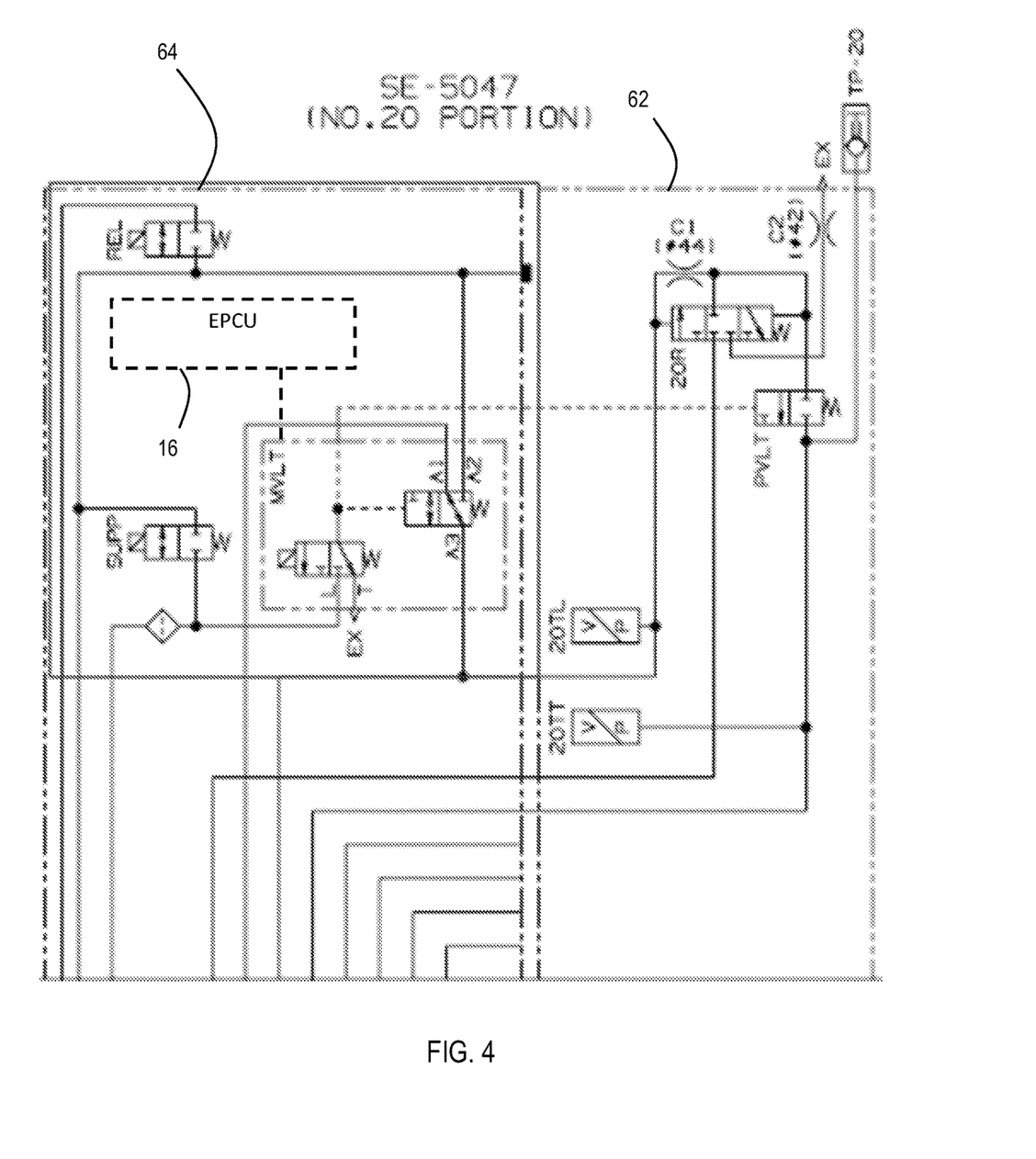
FIG. 4 is a schematic of the No. 20 electropneumatic circuit of a computer controller brake according to the present invention.

Computer controlled brake 14 also includes electropneumatic portion 62, known as the "20 Control Portion" (20CP) that includes the necessary pneumatic components for properly controlling the 20 pipe during operation of the train, including an electropneumatic independent brake module having a lead/trail magnetic valve (MVLT) 64 that is normally responsible for connecting the 20 pipe to the main reservoir and subsequent locomotive independent brake control when the locomotive is set to LEAD. Computer controlled brake 14 is programmed according to the present invention to operate MVLT 64 to maintain the pressure in the 20 pipe when set into consist swap mode by the operator, and thus compensate for any leaks that could lead to an inadvertent release of independent brake 32. For example, the software of ECPU 16 can include programming for the operation of MVLT 64 in connection with the present invention. In this manner, the present invention can take advantage of the existing structure of computer controlled brake 14 to implement the new consist swap mode.

Figure 5:
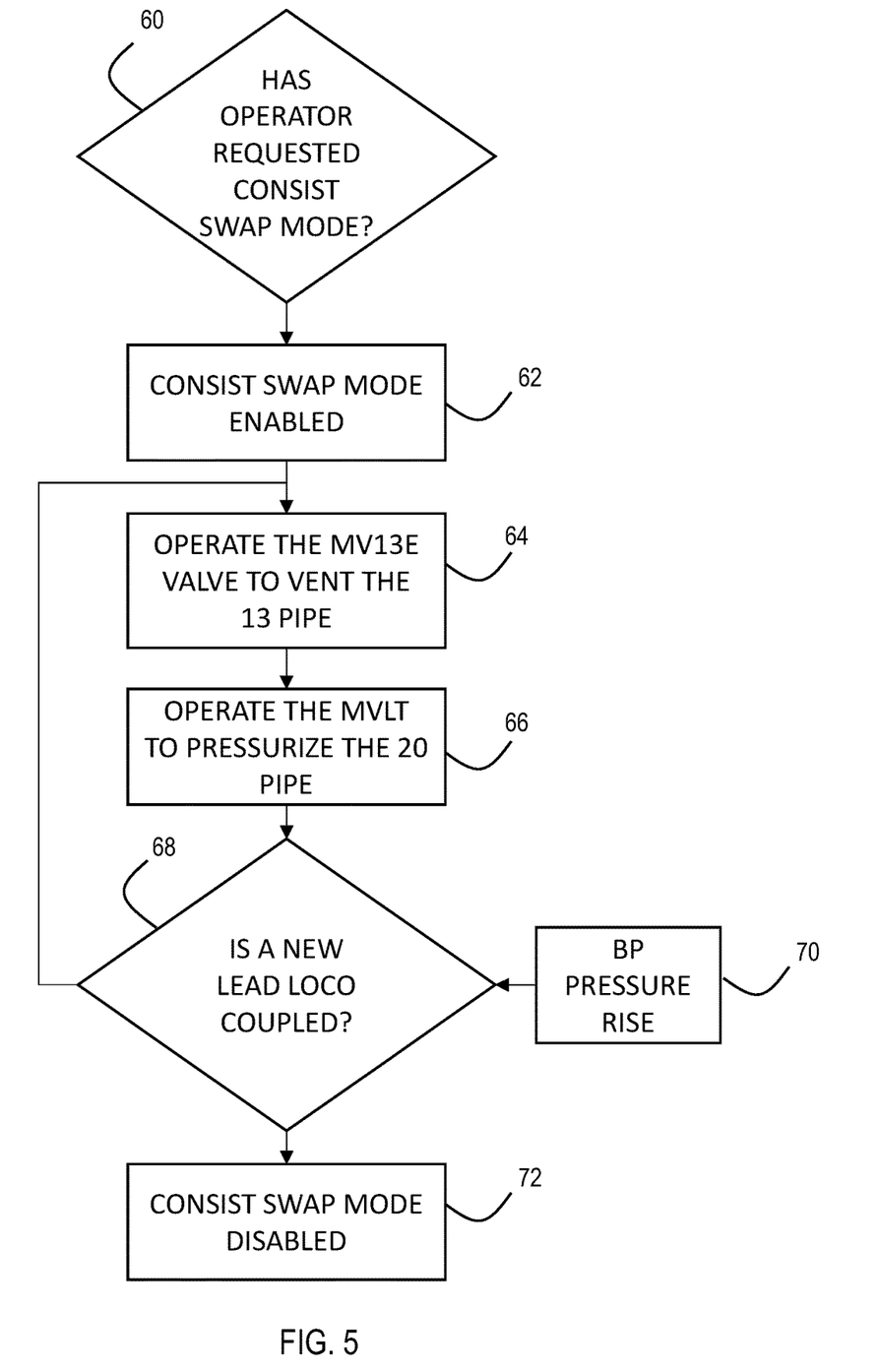
FIG. 5 is a flowchart of a consist swap mode according to the present invention.

Referring to FIG. 5, computer controlled brake 14 is placed in consist swap mode according to the present invention via operator input into locomotive computer display 18. When a check 60 determines that an operator has commanded consist swap mode, computer controlled brake 14 enters consist swap mode 62 and initiates an exhaust of 13 pipe pressure by operating the MV13E valve 64 to vent the 13 pipe to atmosphere. As a result, the 13 pipe cannot become unintentionally pressurized, thereby mitigating an unintentional release the automatic brake. Computer controlled brake 14 also operates the 20CP MVLT 66 to maintain pressure in the 20 pipe. Computer controlled brake 14 automatically detects brake pipe control from a new lead locomotive 12c by automatically performing a check 68 to determine whether a new lead locomotive 12c has been coupled to trail locomotive 12a by sensing a rise in the brake pipe pressure 70. If so, computer controlled brake 14 disables consist swap mode automatically by closing MV13E 64 to end venting of the 13 pipe and de-energizing 20CP 20CP MVLT 66 to stop pressurizing the 20 pipe. Thus, computer controlled brake 14 can thus automatically end the consist swap mode and revert back to conventional trail locomotive operations.

As described above, the present invention may be a system, a method, and/or a computer program associated therewith and is described herein with reference to flowcharts and block diagrams of methods and systems. The flowchart and block diagrams illustrate the architecture, functionality, and operation of possible implementations of systems, methods, and computer programs of the present invention. It should be understood that each block of the flowcharts and block diagrams can be implemented by computer readable program instructions in software, firmware, or dedicated analog or digital circuits. These computer readable program instructions may be implemented on the processor of a general purpose computer, a special purpose computer, or other programmable data processing apparatus to produce a machine that implements a part or all of any of the blocks in the flowcharts and block diagrams. Each block in the flowchart or block diagrams may represent a module, segment, or portion of instructions, which comprises one or more executable instructions for implementing the specified logical functions. It should also be noted that each block of the block diagrams and flowchart illustrations, or combinations of blocks in the block diagrams and flowcharts, can be implemented by special purpose hardware-based systems that perform the specified functions or acts or carry out combinations of special purpose hardware and computer instructions.

What is claimed is:

1. An electronic air brake system, comprising:
a computer controlled brake having a first magnet valve that can selectively couple a source of 13 pipe pressure to atmosphere and a second magnetic valve that can selectively pressurize a source of 20 pipe pressure; and
wherein the computer controlled brake is programmed to operate the first magnet valve to couple the source of 13 pipe pressure to atmosphere and to operate the second magnet valve to pressurize the source of 20 pipe pressure in response to an operator input indicating a consist swap is to take place, and
wherein the computer controlled brake is further programmed to operate the first magnetic valve to disconnect the source of 13 pipe pressure from atmosphere and to operate the second magnetic valve to stop pressurizing the source of 20 pipe pressure in response to detection of a rise in brake pipe pressure resulting from a new lead locomotive.

2. The computer controlled brake of claim 1, wherein the computer controlled brake includes an electro-pneumatic control unit that is programmed to operate the first magnet valve and the second magnet valve.

3. The computer controlled brake of claim 2, wherein the computer controlled brake includes a first electropneumatic portion containing the first magnetic valve and a second electropneumatic portion containing the second magnetic valve.

4. The computer controlled brake of claim 3, wherein the first electropneumatic portion contains a first set of pneumatic components for controlling the 13 pipe during operation of a train.

5. The computer controlled brake of claim 4, wherein the electro-pneumatic control unit is programmed to operate the first magnetic valve of the first electropneumatic portion to exhaust the 13 pipe to disable a locomotive automatic brake during a bail off.

6. The computer controlled brake of claim 5, wherein the second electropneumatic portion contains a second set of pneumatic components for controlling the 20 pipe during operation of a train.

7. The computer controlled brake of claim 6, wherein the electro-pneumatic control unit is programmed to operate the second magnetic valve of the second electropneumatic portion to connect the 20 pipe to a main reservoir of the train.

8. The computer controlled brake of claim 7, further comprising a locomotive computer display that can receive the operator input indicating the consist swap is to take place.

9. A method of performing a consist swap without a risk of rollaway, comprising the steps of:
providing a computer controlled brake having a first magnet valve that can selectively couple a source of 13 pipe pressure to atmosphere and a second magnetic valve that can selectively pressurize a source of 20 pipe pressure;
receiving an operator input indicating a consist swap is desired;
using the computer controlled brake to operate the first magnet valve to couple the source of 13 pipe pressure to atmosphere and to operate the second magnet valve to pressurize the source of 20 pipe pressure; and
using the computer controlled brake to operate the first magnetic valve to disconnect the source of 13 pipe pressure from atmosphere and to operate the second magnetic valve to stop pressurizing the source of 20 pipe pressure in response to detection of a rise in brake pipe pressure.

10. The method of claim 9, wherein the step of using the computer controlled brake to operate the first magnet valve to couple the source of 13 pipe pressure to atmosphere and to operate the second magnet valve to pressurize the source of 20 pipe pressure is performed by an electro-pneumatic control unit of the computer controlled brake.

11. The method of claim 10, wherein the step of using the computer controlled brake to operate to operate the first magnetic valve to disconnect the source of 13 pipe pressure from atmosphere and to operate the second magnetic valve to stop pressurizing the source of 20 pipe pressure in response to detection of a rise in brake pipe pressure is performed by the electro-pneumatic control unit of the computer controlled brake.

12. The method of claim 10, wherein the step of receiving the operator input indicating the consist swap is desired is performed by locomotive computer display of the computer controlled brake.

\* \* \* \* \*